United States Patent
Burckart et al.

(10) Patent No.: US 10,380,555 B2
(45) Date of Patent: Aug. 13, 2019

(54) POLICY DRIVEN ONLINE MEETING UPDATES

(75) Inventors: Erik J. Burckart, Raleigh, NC (US); James Patrick Galvin, Jr., Oak Ridge, NC (US); Brian L. Pulito, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 2786 days.

(21) Appl. No.: 10/733,658

(22) Filed: Dec. 11, 2003

(65) Prior Publication Data

US 2005/0144231 A1    Jun. 30, 2005

(51) Int. Cl.
*G06Q 10/10*    (2012.01)

(52) U.S. Cl.
CPC .................................. *G06Q 10/109* (2013.01)

(58) Field of Classification Search
CPC .................................................. G06Q 10/109
USPC ...................... 715/753–754; 3/753
See application file for complete search history.

(56) References Cited

U.S. PATENT DOCUMENTS

| | | | |
|---|---|---|---|
| 5,369,693 A * | 11/1994 | Pillet et al. | 379/203.01 |
| 5,465,370 A * | 11/1995 | Ito et al. | 709/204 |
| 5,732,200 A * | 3/1998 | Becker et al. | 358/1.15 |
| 5,758,079 A * | 5/1998 | Ludwig et al. | 709/204 |
| 6,952,714 B2 * | 10/2005 | Peart | 709/203 |
| 7,007,235 B1 * | 2/2006 | Hussein et al. | 715/751 |
| 7,013,330 B1 * | 3/2006 | Tarbotton et al. | 709/219 |
| 7,441,041 B2 * | 10/2008 | Williams et al. | 709/232 |
| 2001/0036865 A1 * | 11/2001 | Neal, III | 463/42 |
| 2002/0080172 A1 * | 6/2002 | Viertl | 345/751 |
| 2002/0097688 A1 * | 7/2002 | Norris | 370/260 |
| 2002/0138588 A1 * | 9/2002 | Leeds | 709/217 |
| 2003/0018694 A1 * | 1/2003 | Chen et al. | 709/200 |
| 2003/0110280 A1 * | 6/2003 | Hinchliffe et al. | 709/232 |
| 2003/0208534 A1 * | 11/2003 | Carmichael | 709/203 |
| 2004/0215722 A1 * | 10/2004 | Mukherjee | 709/205 |
| 2004/0264376 A1 * | 12/2004 | Schrodi | 370/235 |
| 2005/0144284 A1 * | 6/2005 | Ludwig et al. | 709/226 |
| 2006/0179110 A1 * | 8/2006 | Brown | 709/204 |
| 2006/0271419 A1 * | 11/2006 | O'Sullivan | 705/8 |

OTHER PUBLICATIONS

Mario Baldi, Yoram Ofek, Bulent Yener☐☐ Adaptive Group Multicast with Time-Driven Priority☐☐IEEE/ACM Transactions on Networking, vol. 8, No. 1, Feb. 2000.*

* cited by examiner

*Primary Examiner* — Andrea N Long
(74) *Attorney, Agent, or Firm* — Steven M. Greenberg, Esq.; Shutts & Bowen LLP

(57) ABSTRACT

A method and system is provided for policy driven, online meeting updates during the course of an electronic meeting. The invention defines one or more groups of participants in an electronic meeting, and assigns a unique relative priority to each group of participants. Meeting events, such as slide changes or other data that is sent to the various participants for viewing, are transmitted to the various groups in a sequence ordered by the relative priorities assigned to the groups. Alternatively, the invention provides for randomly staggering the delivery of data to the various groups. Both embodiments alleviate the scalability problems that arise for electronic meetings having large numbers of participants.

6 Claims, 2 Drawing Sheets

POLICY DRIVEN ONLINE MEETING UPDATES

BACKGROUND OF THE INVENTION

Statement of the Technical Field

The present invention relates to the field of electronic meetings and more particularly to a method and system for transmitting data to participants in larger scale electronic meetings.

Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include instant messaging, Internet telephony, application sharing, and electronic meetings.

However, there is a significant scalability problem that can occur during electronic meetings which include a large number of participants. One problem is triggered when a meeting event, such as a slide change, causes all of the participants to make a request to the e-meeting server for the new slide at exactly the same time, thereby overloading the server. In such a case, the network around the server can also overload, causing significant packet losses at the network routers between the servers and client participants, as well as a poor overall meeting experience due to latency. Therefore, it would be desirable to conduct e-meetings in a manner that alleviates the difficulties presented by larger scale meetings.

Furthermore, it should also be recognized that moderators of particular e-meetings are often tailoring their presentations towards a specific audience or group. In addition to this core group, certain ancillary participants may join the meeting to simply listen, or to add input on a smaller scale that makes a lesser impact on the meeting. Therefore it may not be as important to provide refreshes of meeting events to such ancillary participants at the same time as the main, targeted group of participants.

It would be desirable therefore, to provide a method and system for preventing the overload problems associated with large scale e-meetings, which also recognizes that varied nature of e-meeting participants, so as to more efficiently transmit data to the participants, and thereby improve the overall meeting experience.

SUMMARY OF THE INVENTION

The present invention addresses the deficiencies of the art in respect to transmitting data to a large number of participants in an electronic meeting and provides a novel and non-obvious method, system and apparatus for policy driven, online meeting updates during the course of an electronic meeting. The invention defines one or more groups of participants in an electronic meeting, and assigns a unique priority to each group of participants. Meeting events, such as slide changes or other data that is sent to the various participants for viewing, are transmitted to the various groups in order of priority assigned to the groups. Alternatively, the invention provides for staggering the delivery of data to various groups of randomly selected participants. Both embodiments alleviate the scalability problems that arise for electronic meetings having large numbers of participants.

Methods consistent with the present invention provide a method of conducting electronic meetings. First, one or more groups participating in an electronic meeting are defined, and a relative priority for each group is assigned. The relative priority assigned to each group is unique to the group. Next, after a meeting event is generated, logic is triggered to provide the meeting event to the groups in a sequence ordered by the relative priority for each group.

In another embodiment of the present invention, a method of conducting electronic meeting is provided for meetings having a plurality of participants. A meeting event is generated. In addition, a first group of participants is selected at random from the plurality of participants. The first group has a pre-configured maximum number of participants. Logic is then triggered to provide the meeting event to the first group of participants.

Systems consistent with the present invention include a system for conducting electronic meetings. A meeting server executing a meeting policy is configured to define one or more groups participating in an electronic meeting, and to assign a relative priority for each group. The relative priority for each group is unique to the group. Triggering logic is included to provide a meeting event generated by the server to the groups in a sequence ordered by the relative priority for each group.

In another embodiment, the present invention provides for a system for conducting electronic meetings having a plurality of participants. A meeting server is provided which executes a meeting policy configured to select at random a group of participants from the plurality of participants. The group has a pre-configured maximum number of participants. The system also includes triggering logic to provide a meeting event generated by the server to the group of participants.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention provides a method and system for conducting electronic meetings that alleviates the scalability problems arising from electronic meetings having a large number of participants. In accordance with the present invention, certain identified e-meeting participants or classes of e-meeting of participants can be prioritized for receiving e-meeting presentation updates sooner (or more frequently) than other e-meeting participants or other classes of e-meeting participants. Specifically, one or more groups of participants in a e-meeting can be defined. Subsequently, a unique relative priority can be assigned to each group of e-meeting participants. Meeting events able to trigger image updates can be transmitted to the various groups in an order of priority assigned to the groups. Additionally, in a preferred embodiment of the present invention, the delivery of triggering events can be randomly staggered to load balance the triggering of image updates.

Figure 1:
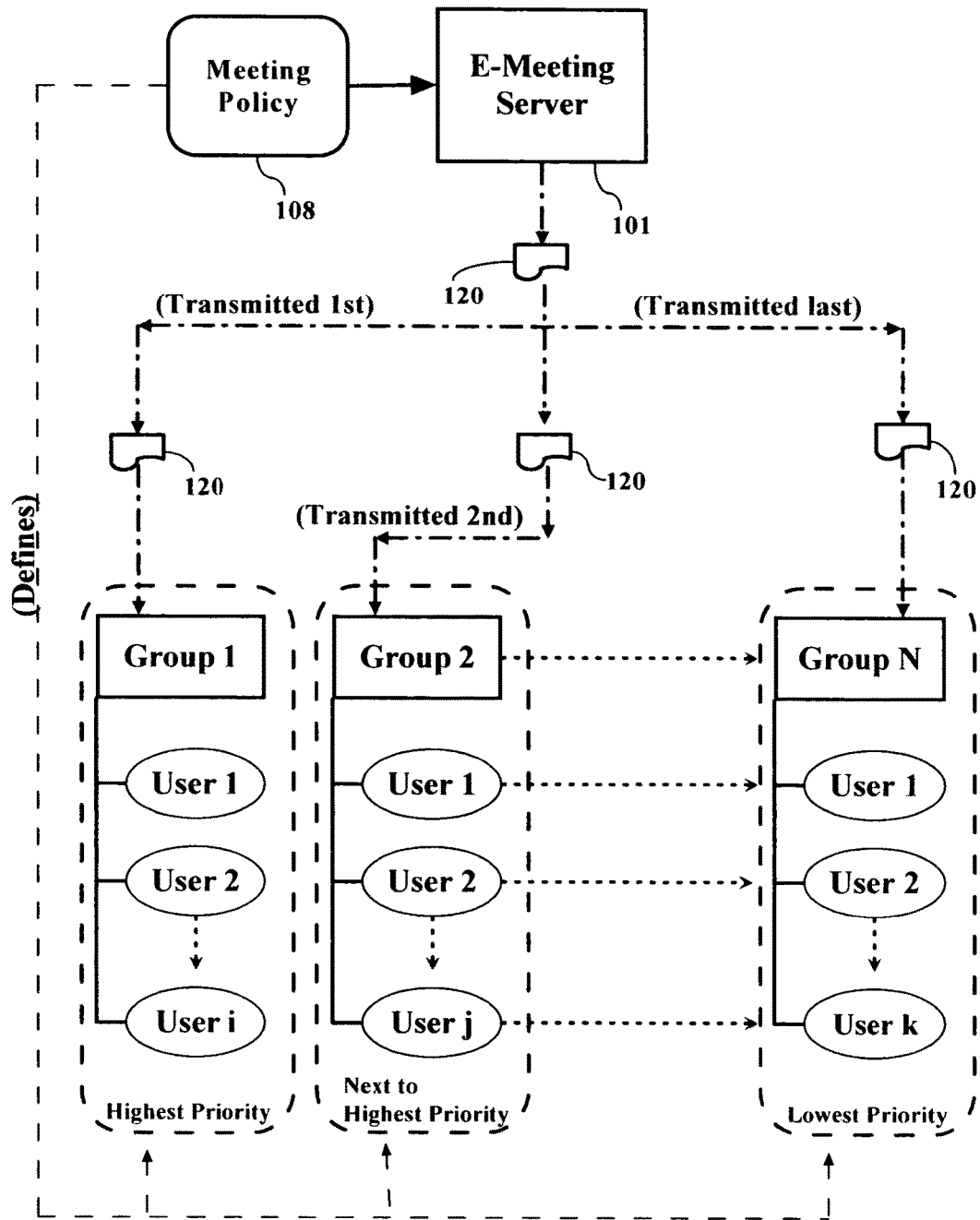
FIG. 1 is a conceptual illustration of a system configured to conduct an electronic meeting in accordance with the principles of the present invention.

In further illustration, FIG. 1 is a block diagram illustrating a system configured to conduct an electronic meeting in accordance with the principles of the present invention. The system of the present invention can include an e-meeting server 101 coupled to a number of e-meeting participants. The e-meeting server 101 can be configured to distribute e-meeting imagery to the e-meeting participants so as to provide a virtual conference room for the e-meeting participants. Notably, the e-meeting server 101 can include an e-meeting policy 108 defining a set of rules for how the electronic meetings are to be conducted by the server 101. The policy 108 can be one static policy, a variant policy, or a number of static or variant policies, depending upon what is preferred.

Notably, the e-meeting participants of the present invention, hereinafter referred to as "users", can be organized into one or more groups as shown in FIG. 1. More particularly, in a first embodiment of the present invention, the meeting policy 108 can direct the e-meeting server 101 to identify and define one or more set of groups of participants in an e-meeting. As it will be apparent to the skilled artisan, the meeting policy 108 can define up to N different groups, each having any number of users. The meeting policy 108 further can direct the server 101 to identify and assign a "relative priority" to the defined groups. As used herein, the term "relative priority" shall mean a level of priority that distinguishes one group from another. The levels of priority can be hierarchical, such that a first group can have the highest priority, a second group can have the next highest priority, and the last group can have the lowest priority.

The e-meeting server 101 can be configured to produce e-meeting events 120 which event can be made available to the users. As used herein, a "meeting event" can include any data created, generated, or transmitted in the course of an e-meeting. The meeting event can be generated within the e-meeting server 101 itself, or the meeting event 120 can be generated outside of the e-meeting server 101, such as by any client machine or user coupled to the e-meeting server 101. Examples of typical meeting events 120 can include slide show slide changes, text changes, and other audible or visual presentation changes that commonly occur within e-meetings to indicate that a screen update will be required by the users.

The meeting policy 108 can be configured to dictate when a particular one of the meeting events 120 can be made available to the various groups of users in a sequence ordered by the relative priority for each group. In further illustration, FIG. 1 depicts the transmission of a particular one of the meeting events 120 from the e-meeting server 101 to the various groups of users. Since Group 1 has been accorded the highest relative priority by the meeting policy 108 (for illustrative purposes only) the meeting event 120 can be transmitted first to Group 1. By comparison, since Group 2 has been accorded the next highest relative priority by the meeting policy 108, the meeting event 120 can be transmitted next to Group 1. Finally, since Group N has been accorded the lowest relative priority by the meeting policy 108, the meeting event 120 can be transmitted last to Group 1.

It will be recognized by one or ordinary skill in the art that the transmittal of meeting events can be accomplished in a variety of ways. In another embodiment of the present invention, the e-meeting server 101 can be configured to send messages or commands to the various client machines of the users, indicating that the meeting event 120 is available for transmittal. The meeting event 120 then can be transmitted from whence it had been generated, which may include any machine in the network of machines coupled to the e-meeting server 101.

In each case however, logic can be triggered to make the meeting event 120 available, or to transmit the meeting event 120 to the various users in the electronic meeting in a time sequence ordered by the relative priority of the groups of users defined by the meeting policy 108. In this manner, the meeting events can be staggered to users in stages, instead of being simultaneously distributed to all the users. Furthermore, the staggering can be executed in pre-configured time intervals.

Alternatively, the meeting policy 108 may not be configured to set priorities for groups of users. When no such "priority policy" is available, the server 101 can be configured to instead select at random groups of users to receive meeting events. The meeting events can then be made available to each additional randomly selected groups of users in a staggered fashion. Again, the staggering can be executed in pre-configured time intervals.

Figure 2:
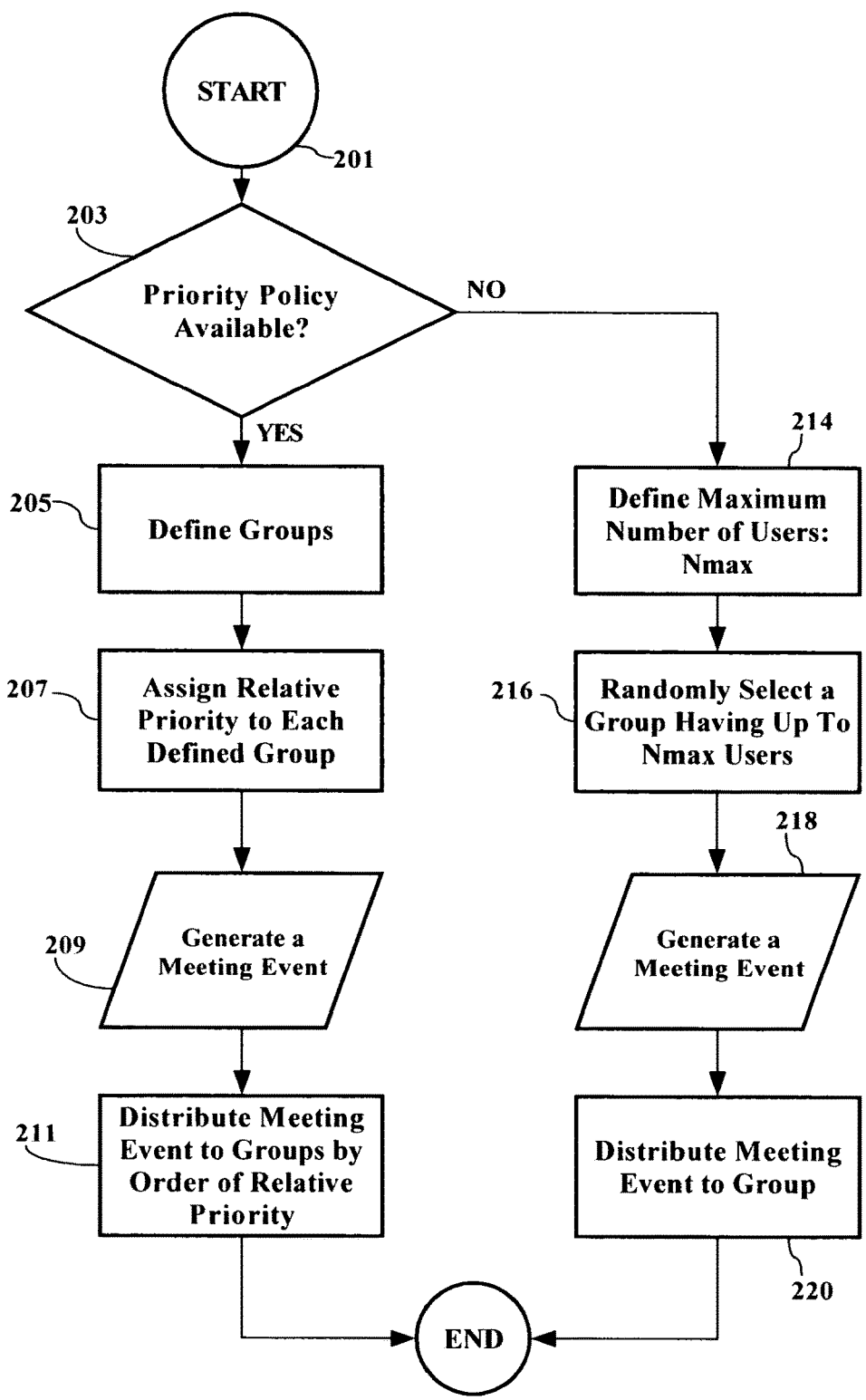
FIG. 2 is a flowchart illustrating the process of conducting an electronic meeting in accordance with the principles of the present invention.

FIG. 2 is a flowchart illustrating the process of conducting an electronic meeting in accordance with the principles of the present invention. After starting at step 201, it is determined in step 203 whether a priority policy is available as the meeting policy. If a priority policy is available, the groups of users are defined in step 205, and a relative priority is assigned to each defined group in step 207. After a meeting event is generated in step 209, the meeting event is made available, transmitted, or distributed in some other fashion in step 211 to the defined groups in order of relative priority, which can be staggered by a pre-configured time interval.

If no priority policy is available, the process proceeds to step 214, where a pre-configured maximum number of participants is defined. Next, a random number of users are selected in step 216 to receive meeting events. The number can include up to the pre-configured maximum. After a meeting event is generated in step 218, the meeting event is made available, transmitted, or distributed in some other fashion in step 220 to the randomly selected group. If desired, the process can also return to step 216 to randomly select additional groups of users, each group having users not previously included in any other group, such that meeting events can be made available, transmitted, or distributed to the additional groups of users in a staggered fashion. The staggering can be separated in time by a pre-configured time interval.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for policy driven, online meeting updates during a course of an electronic meeting, comprising:
    establishing an electronic meeting in an e-meeting server for different participants over a computer communications network;
    determining in the e-meeting server that a priority policy is available as a meeting policy; and,
    on condition that it is determined that a priority policy is available as a meeting policy, providing a meeting event for the e-meeting to different groups of the participants in the electronic meeting in a sequence ordered by a relative priority assigned for each group;
    on condition that it is determined that a priority policy is not available as a meeting policy, providing the meeting event to randomly selected different groups of the participants in a staggered fashion.

2. The method of claim 1, further comprising:
    staggering the transmitting of the meeting event to the groups by a pre-configured time interval.

3. A non-transitory machine readable storage device having stored thereon a computer program for conducting electronic meetings, said computer program comprising a routine set of instructions which when executed by a machine cause the machine to perform a method for policy driven, online meeting updates during a course of an electronic meeting, comprising:
    establishing an electronic meeting in an e-meeting server for different participants over a computer communications network;
    determining in the e-meeting server that a priority policy is available as a meeting policy; and,
    on condition that it is determined that a priority policy is available as a meeting policy, providing a meeting event for the e-meeting to different groups of the participants in the electronic meeting in a sequence ordered by a relative priority assigned for each group;
    on condition that it is determined that a priority policy is not available as a meeting policy, providing the meeting event to randomly selected different groups of the participants in a staggered fashion.

4. The machine readable storage device of claim 3, further causing said machine to perform the step of:
    staggering the transmitting of the meeting event to the groups by a pre-configured time interval.

5. A system for policy driven, online meeting updates during a course of an electronic meeting, comprising:
    a hardware meeting server comprising memory and at least one processor and configured for:
    establishing an electronic meeting in the hardware meeting server for different participants over a computer communications network;
    determining in the e-meeting server that a priority policy is available as a meeting policy; and,
    on condition that it is determined that a priority policy is available as a meeting policy, providing a meeting event for the e-meeting to different groups of the participants in the electronic meeting in a sequence ordered by a relative priority assigned for each group;
    on condition that it is determined that a priority policy is not available as a meeting policy, providing the meeting event to randomly selected different groups of the participants in a staggered fashion.

6. The system of claim 5, wherein the server is further configured for:
    staggering the transmitting of the meeting event to the groups by a pre-configured time interval.

* * * * *